United States Patent
Sahinoja et al.

(10) Patent No.: US 8,219,664 B2
(45) Date of Patent: Jul. 10, 2012

(54) DEFINING NODES IN DEVICE MANAGEMENT SYSTEM

(75) Inventors: Mikko Sahinoja, Tampere (FI); Jussi Piispanen, Tampere (FI)

(73) Assignee: Nokia Corporation, Espoo (FI)

( * ) Notice: Subject to any disclaimer, the term of this patent is extended or adjusted under 35 U.S.C. 154(b) by 752 days.

(21) Appl. No.: 11/043,730

(22) Filed: Jan. 26, 2005

(65) Prior Publication Data

US 2006/0212558 A1 Sep. 21, 2006

Related U.S. Application Data

(60) Provisional application No. 60/544,408, filed on Feb. 13, 2004.

(30) Foreign Application Priority Data

Jan. 30, 2004 (FI) ...................................... 20040141

(51) Int. Cl.
*G06F 15/173* (2006.01)
(52) U.S. Cl. ........................................................ 709/224
(58) Field of Classification Search .................... 709/224
See application file for complete search history.

(56) References Cited

U.S. PATENT DOCUMENTS

| | | | | |
|---|---|---|---|---|
| 7,278,106 | B1 * | 10/2007 | Mason | 715/744 |
| 2003/0069941 | A1 | 4/2003 | Peiffer | |
| 2003/0204640 | A1 | 10/2003 | Sahinoja et al. | |
| 2004/0044659 | A1 * | 3/2004 | Judd et al. | 707/3 |
| 2005/0039178 | A1 * | 2/2005 | Marolia et al. | 717/168 |
| 2005/0055397 | A1 * | 3/2005 | Zhu et al. | 709/200 |
| 2006/0039564 | A1 * | 2/2006 | Rao | 380/270 |

FOREIGN PATENT DOCUMENTS

JP 3286252 12/1991

OTHER PUBLICATIONS

Coffing et al., Teradata SQL, Unleash the Power, 3rd Edition http://www.coffingdw.com/sql/tdsql.htm, 2001.*
"SyncML Device Management Tree and Description," Open Mobile Alliance, Version 1.1.2, Dec. 2, 2003, 1 page.
"Indication for case sensitivity," Open Mobile Alliance, Apr. 21, 2004, 2 pages.
"Indication for case sensitivity," Open Mobile Alliance, Jul. 13, 2004, 3 pages.
"Column-Specific Case Sensitivity," IBM Technical Disclosure Bulletin, NB9309273, vol. 36 No. 09B, Sep. 1993, 1 page.
T. Berners-Lee et al., "Uniform Resource Identifiers (URI): Generic Syntax," Requests for Comments: 2396, The Internet Society, Aug. 1998, 40 pages.
Open Mobile Alliance, "SyncML Device Management Protocol", Version 1.1.2, Jun. 12, 2003.
Open Mobile Alliance, "SyncML Representation Protocol Device Management Usage", Version 1.1.2, Jun. 12, 2003.

* cited by examiner

*Primary Examiner* — Hussein Elchanti
*Assistant Examiner* — Maceeh Anwari
(74) *Attorney, Agent, or Firm* — Harrington & Smith

(57) ABSTRACT

The invention relates to a method for defining the nodes of a management structure used in device management in a device management system. In the arrangement, case sensitivity information is associated with at least one node to define whether to distinguish between upper-case and lower-case letters. At least one node is defined according to the case sensitivity information.

24 Claims, 2 Drawing Sheets

DEFINING NODES IN DEVICE MANAGEMENT SYSTEM

RELATED APPLICATIONS

This application claims the benefit of the U.S. Provisional Application No. 60/544,408, filed Feb. 13, 2004, the content of which is incorporated by reference in its entirety.

FIELD OF THE INVENTION

The invention relates to defining the nodes of a management structure used in device management in a device management system.

BACKGROUND OF THE INVENTION

As different data processing devices, such as mobile stations, become more complex, the significance of device management becomes more pronounced. Devices require several different settings, such as settings related to Internet access points, and setting them manually by the user is arduous and difficult. To solve this problem, for instance, device management solutions have been developed so that the administrator of a company's information system or a teleoperator can set an appropriate configuration in the device. Device management generally refers to actions by which a person not using the device can change the configuration of the device; for instance change the settings or even a protocol used by the device. In addition to device-specific settings, it is also possible to transmit user-specific data, such as user profiles, logos, ringing tones, and menus with which the user can personally modify the settings of the device, or the modification takes place automatically in connection with device management.

One of the device management standards is OMA (Open Mobile Alliance) DM (Device management), which is partly based on the SyncML (Synchronization Markup Language) protocol. For instance, a personal computer (PC) can act as a device management server in a device management protocol and a mobile station as a device management client. In terms of device management, the device management client transmits information concerning itself in a session initiation message to the device management server, and the device management server replies by transmitting its own information and server management commands. The device management client replies to these with status information, after which the server can end the session or transmit more server management commands. If the server transmits more server management commands, the client is to reply to them with status information. The server can always, after receiving status information, end the session or continue it by transmitting more server management commands. Device management can also be implemented by first transmitting queries to the user on what s/he wants to update, and information on the user's selections is transmitted to the server. After this, the server can in the next packet transmit the updates/commands the user wants.

The items managed in the device management client are arranged as management objects. The management objects are entities that can be managed by server management commands in the device management client. The management object can for instance be a number or a large entity, such as background image or screensaver. At least some of the management objects can be standardized; the OMA DM device management standards include three standardized management objects at the moment.

In OMA device management, the management objects are arranged in a management tree, which is illustrated in FIG. 1. The management tree is made up of nodes and defines at least one management object formed of one or more nodes or at least one parameter of a node. The following examines nodes that form the management objects. The node can be an individual parameter, subtree or data collection. For instance, a "Vendor" node is an interior node, because it has child objects, "ScreenSaver" and "RingingTones". "ScreenSaver" is a leaf node, because it does not have child objects. "RingingTones" is also an interior node, because it has child objects. The node may comprise at least one parameter that may be a configuration value or a file, such as a background image file in the node "ScreenSaver". The content of the node can also be a link to another node. Each node can be addressed by a uniform resource identifier (URI). URI of a node is formed starting from the root "/", and when proceeding along the tree, each node has a name that is added to the earlier ones using "/" as the separator. For instance, the node "RingingTones" can be addressed by URI "/Vendor/RingingTones/". The nodes can be fixed or dynamic. The device management client or server can add dynamic nodes to the management tree.

The OMA DM device management standards define that the management tree must be case sensitive. Some environments do not distinguish between upper-case letters or lower-case letters (case insensitive); for instance, path names are case insensitive. Information in this kind of environment may also be necessary to store into the OMA DM device management tree; for instance, a specific directory structure should be added to the device management tree as information managed according to the OMA DM device management standard. This may, however, cause problems, because a case insensitive system may change file names and/or nodes cannot be referred to correctly in the device management tree. The directory structure of an operating system, for instance, cannot be directly modelled to the management tree, and a voluminous mapping table may be needed to verify the information in the management tree.

BRIEF DESCRIPTION OF THE INVENTION

A method, device management system, data processing device, computer program product and data structure have now been developed, which are characterized by what is stated in the independent claims. Some embodiments of the invention are described in the dependent claims.

According to the invention, at least one node is associated with case sensitivity information that defines whether to distinguish between upper-case letters and lower-case letters. A management structure node can then be defined (in the device management client and/or server) according to the case sensitivity information.

The node generally refers to a device management entity that is configurable by a third party, such as the settings of an Internet access point, without being limited to the OMA device management nodes. The management structure can correspondingly be any structure containing nodes, without being limited to the device management trees of OMA device management. The case sensitivity information refers to any direct or indirect information associated with at least one node that defines whether to distinguish between upper-case letters and lower-case letters.

The invention makes it possible to define, even specifically for each node, whether to distinguish between upper-case letters and lower-case letters. This way, it is possible to avoid mistakes when working with environments that are case insensitive, and to define the nodes associated with these systems as case insensitive. For instance, the correct node can be found in the management structure regardless of the format (concerning case sensitivity) indicated by the search request, when, according to the case sensitivity information, all nodes with the same name are searched without separating uppercase letters and lower-case letters.

According to one embodiment of the invention, node characteristics are defined in a device description for a management structure formed for at least one device to be managed, and the device description comprises said information for at least one node. The case sensitivity information can then be checked from the device description, and it is not necessary to store entire management structures on the management server, or fetch them from the client.

According to another embodiment, the case sensitivity information associated with a first node is also set to apply to a second node. In such a case, the case sensitivity information of the first node is checked when there is a need to check the case sensitivity information of the second node, and the second node is defined according to the case sensitivity information associated with the first node. With this embodiment, it is possible to reduce the amount of stored information, because it is not necessary to store the case sensitivity information separately for each node.

BRIEF DESCRIPTION OF THE FIGURES

The invention will now be described in greater detail by means of preferred embodiments and with reference to the attached drawings, in which.

DETAILED DESCRIPTION OF THE INVENTION

One embodiment of the invention is described in the following in a system supporting OMA device management; it should, however, be noted that the invention can be applied to any device management system, in which the device management objects can also be organized in other than tree structures.

Figure 1:
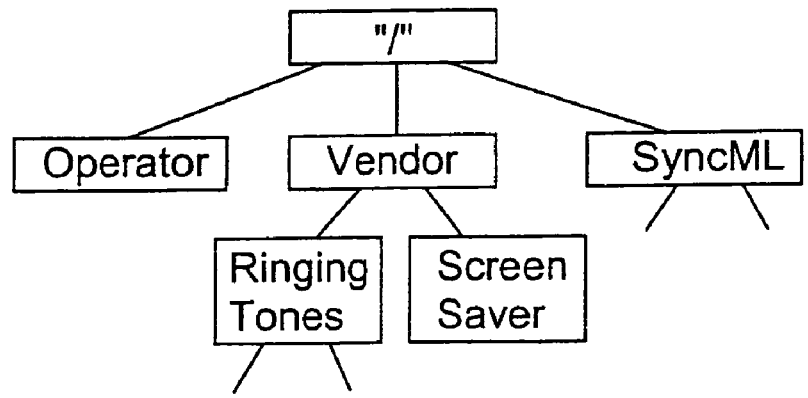
FIG. 1 illustrates a management tree.
Figure 2:
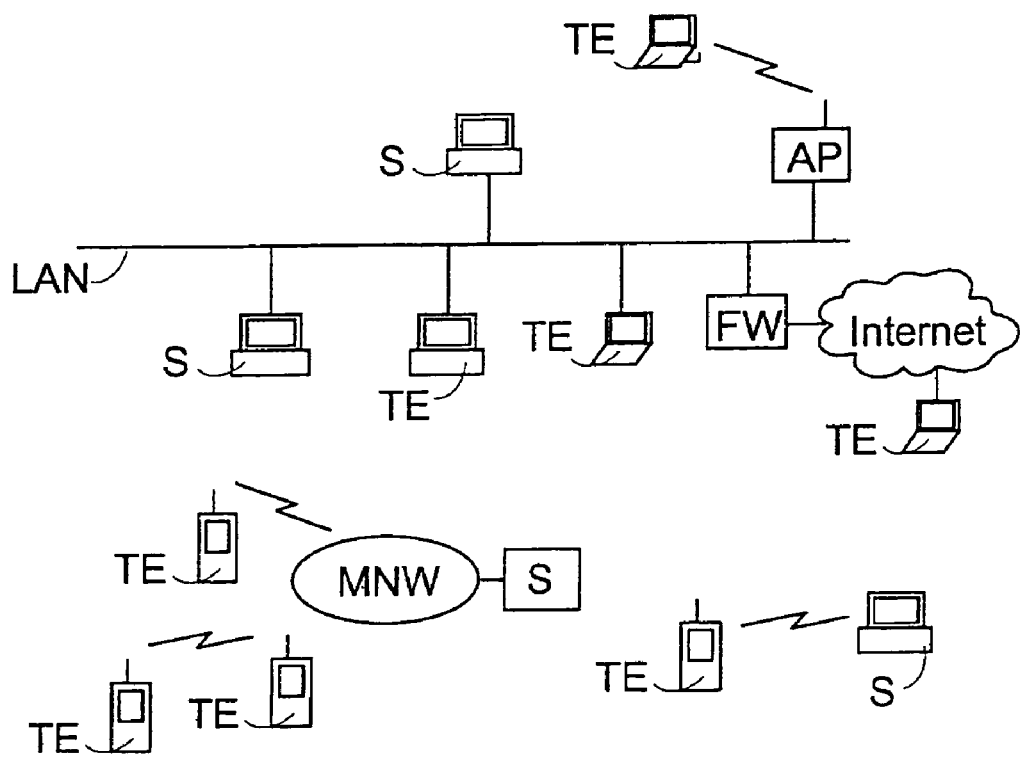
FIG. 2 illustrates a management system.

FIG. 2 illustrates a networked system. A network server or a PC typically serves as the server S. A mobile station, PC, laptop computer, or PDA (Personal Digital Assistant) device typically serves as the terminal TE. In the following embodiments, it is assumed that for device management, the terminal TE serves as the device management client and the server S as the device management server. The server S can manage several clients TE.

FIG. 2 shows two examples, in the first of which clients TE and management servers S are connected to a local area network LAN. A client TE connected to the network LAN comprises a functionality, such as a network card and software controlling data transmission, for communicating with the devices in the network LAN. The local area network LAN can be any kind of local area network and TE can also be connected to the server S through the Internet typically using a firewall FW. The terminal TE can also be connected to the local area network LAN wirelessly through an access point AP.

In the second example, the client TE communicates with the server S through a mobile network MNW. A terminal TE connected to the network MNW comprises a mobile station functionality for communicating wirelessly with the network MNW. There may also be other networks, such as a local area network LAN, between the mobile network MNW and server S. The mobile network MNW can be any known wireless network, for instance a network supporting GSM services, a network supporting GPRS (General Packet Radio Service) services, a third-generation mobile network, such as a network according to the network specifications of 3GPP ($3^{rd}$ Generation Partnership Project), a wireless local area network WLAN, a private network, or a combination of several networks. One important service of the transport layer in many mobile networks is WAP that comprises a WSP (Wireless Session Protocol) layer with which a transport service can be provided for a device management application layer in a client TE and server S. The system then comprises at least one WAP gateway and possibly one or more WAP proxies. Other protocols can also be used to transport device management messages. The lower-layer transport techniques can be circuit- or packet-switched SMS-based message transmission in accordance with the properties of the underlying mobile network MNW. In addition to the earlier examples, many other device management configurations are also possible, such as a management connection between terminals TE or a direct management connection between the terminal TE and server S by using a wireless or wire connection without any other network elements.

The terminal TE and server S comprise memory, a user interface, I/O means for data transmission, and a central processing unit comprising one or more processors. The memory has a non-volatile portion for storing applications controlling the central processing unit and for other information that needs storage, and a volatile portion for use in processing temporary data. The management tree is stored in the memory in the terminal TE, and information and/or device description thereof is also stored in the memory of the server S. A terminal TE serving as an OMA device management client comprises a client agent that takes care of functions related to the management session in the client. A server S serving as a device management server comprises a server agent or server master managing the management session. The client agent can be implemented by executing in TE's central processing unit a computer program code stored in the memory, and the server agent or server master can be implemented by executing in S's central processing unit a computer program code stored in the memory. As already stated, TE and S can serve as a device management server and/or client. Thus, the terminal TE can also comprise at least partly the functions of the server agent so as to be able to serve as a management server in device management between terminals TE. The computer program codes executed in the central processing unit can make the server S, for instance the server agent, also to implement the inventive means for defining nodes and for case separation, some embodiments of which are illustrated in connection with FIG. 3a. The computer program codes executed in the central processing unit of the terminal TE can cause the terminal TE, for instance the client agent, also to implement in the client the inventive means for defining nodes and for case separation, some embodiments of which are illustrated in connection with FIG. 3b. The computer program can be stored on any storage medium, such as the PC hard disk or CD-ROM disk, from which it can be loaded into the memory of the device TE; S running it. The computer program can also be loaded through the network by using a TCP/IP protocol stack, for instance. It is also possible to use hardware solutions or a combination of hardware and software solutions to implement the inventive means. The data structure comprising case sensitivity information can be transferred over a data transmission network, for instance, to the server S and stored in the memory of the server S.

Figure 3A:
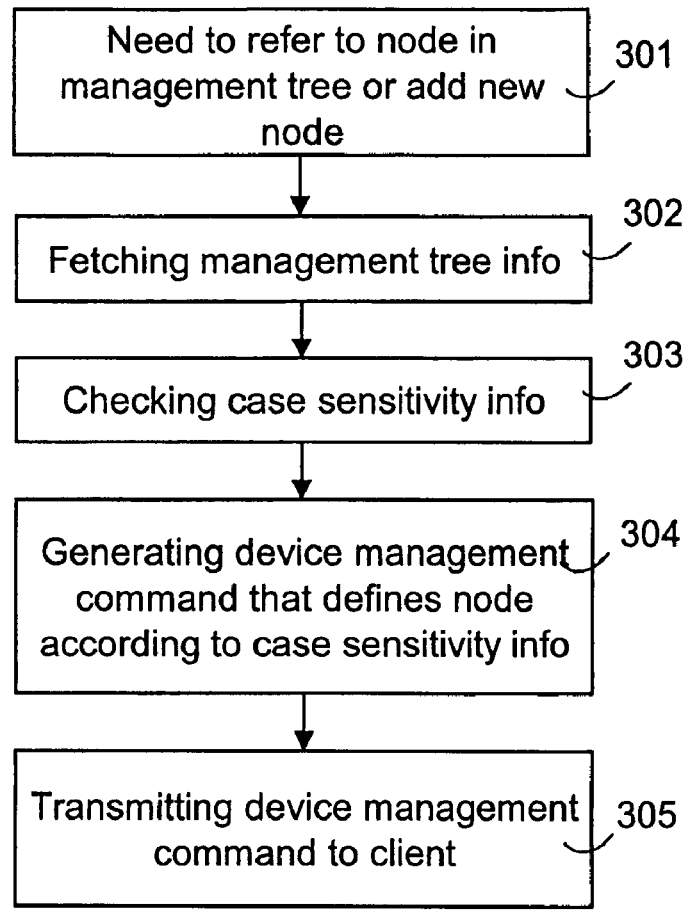
FIGS. 3a and 3b illustrate a method according to an embodiment of the invention.
Figure 3B:
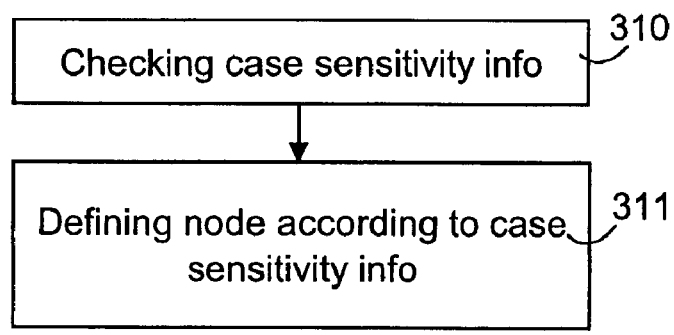

FIG. 3a illustrates a method of an embodiment, which can be performed in the management server S. In step 301, there is a need to add at least one new node to the management tree of the device management client (TE) being managed, or to point to an already existing node in a management command to be transmitted from the management server S. The server S then fetches 302 the information concerning the management tree, at least the information on the node to be referred to or the node under which the new node is to be added. The information on the management tree can be stored in the memory of the server S or the server S can fetch them from an external device, for example over the Internet from a server maintained by the hardware manufacturer. According to one embodiment, the information concerning the management tree can also be obtained from the client TE, for instance by contacting the client TE and requesting them in the beginning of the device management session, or by browsing the contents of the management tree in the client TE. The information concerning the management tree can be obtained directly from the management tree information describing the management objects of the client TE (a copy of at least a part of the management tree can be stored on the server S) or the device description describing the structure of the device, which is later described in more detail.

In the present arrangement, case sensitivity information is associated with at least one node to define whether to distinguish between upper-case letters and lower-case letters. In step 303, the case sensitivity information, which applies to at least the node to be added or referred to, is checked from the management tree information. The case sensitivity information thus defines whether to distinguish between upper-case letters and lower-case letters or not, and it may be defined in many different ways to possibly apply to several different nodes, as illustrated later. Step 304 defines the management command that comprises the information of the node to be added to the management tree or referred to. A new node can have any object type, such as interior node or leaf node. In the case of a new node, the management command can for instance be 'ADD', with which it is possible to add a new node to the management tree, or in the case of an existing node 'GET', which indicates in its. <Target> element the Uniform Resource Identifier <LocURI> of the node whose information is to be fetched.

The management server S is in step 304 specifically arranged to define the name of the node (for instance in the <LocURI> element) by taking into consideration the case sensitivity information: if according to the case sensitivity information upper-case letters and lower-case letter are to be separated in the nodes (case sensitive), the name of the node can be defined using both upper-case and lower-case letters. Then, if the server S maintains in its memory information on the nodes of the management tree of the terminal, the server S. shall, when adding a new node, also store the name of the node in exactly the same format also separating the upper-case and lower-case letters. In this case, the server S processes the upper-case and lower-case formats of the same letter as different letters, in which case a new node replaces an existing node only, if the upper-case and lower-case letters in the names match exactly. For instance, the node "Screensaver" does not replace the node "ScreenSaver". Naturally, this also means that the upper-case and lower-case letters are distinguishable in the name of the stored node next time when information on the node is fetched. However, if according to the case sensitivity information, the upper-case and lower-case letters are not to be separated, a node name comprising the same letters is interpreted as the same regardless of whether the letters are entered in a different way in upper-case and lower-case letters. This, thus, means that for instance a node of the management tree having the same letters as in the node defined in the 'ADD' management command is always replaced by the node defined in the management command. By utilizing the case sensitivity information, it is, thus, possible to avoid mistakes in processing upper-case and lower-case letters in differing systems, because the nodes are defined in the same manner depending on the case sensitivity information. It is possible that in this case, the name of the node to be defined (in the management command and in the node information possibly stored into the memory of the server S) does not contain a mixture of upper-case letters and lower-case letters, but only either upper-case letters or lower-case letters, in which case it is further possible to reduce the possibility of problems especially if the devices in question are ones that do not support the use of case sensitivity information. Thus, the server S should define the name of the node in accordance with the case sensitivity information when performing any device management command in the management tree of the management device TE.

The management server S can transmit 305 a management package containing or identifying at least one node to the management client TE. The management package can for instance comprise an 'ADD' command for new nodes, in which case TE adds the information defined in the nodes into its memory and updates the management tree. In step 305, it is possible to utilize the mechanisms of the device management protocol and the messages defined for it; for a more detailed description of the OMA device management protocol and other commands, for instance, reference is made to the OMA specification "*SyncML Device Management Protocol*", version 1.1.2, 12 Jun. 2003, 41 pages, and the OMA specification. "*SyncML Representation Protocol Device Management Usage*", version 1.1.2, 12 Jun. 2003, 39 pages. In chapter 6.5, the latter specification defines the different protocol operation elements with which the management server S can define management commands to the management tree of the management client TE.

From device management viewpoint, the client device (TE) is also arranged to take into account the case sensitivity information associated with one or more nodes, and to distinguish between upper-case letters and lower-case letters accordingly, or to consider them equal when processing the nodes, for instance when storing a new node to the management tree. The management client, such as terminal equipment TE, can apply the features illustrated in FIG. 3b. Step 310 checks the case sensitivity information associated with the node being processed, according to which the node is defined in the management tree in step 311. According to an embodiment, step 310 can be started, when a management command is received from the management server (S). The management client TE is then arranged to check the case sensitivity information associated (directly or indirectly) with the node identified in the management command. The management client TE can then compare the node identifier with the identifiers of the nodes already in the management tree either taking into consideration or ignoring the differences in the lower-case and upper-case letters.

One example is a situation, in which the ADD command is received for a node and the management tree already has a node with the same name, but the name (e.g. Abc) of the node in the management tree and the name (aBc) of the node in the management command differ in the use of lower-case and upper-case letters. If the properties of the node in the management tree define case sensitivity for upper-case and lower-case letters, the management client TE adds, in step 311, the node 'aBc' as a new node in addition to the node 'Abc'. If no case sensitivity is defined, the management client TE replies to the ADD command by an error message that indicates that the node defined in the ADD command already exists in the management tree. Thus, the management client TE can take case sensitivity into account when executing management commands, and define the node in/to the management tree. In another example, the management client TE can fetch in a corresponding manner in response to a GET command the information of the node in the management tree by taking into consideration the case sensitivity information of the node to be fetched: If case insensitivity is defined for the node 'aBc' indicated by the GET command, the management client TE then fetches the information of the node 'Abc' from the management tree and returns them in response to the GET command. This way, it is also possible to avoid problems caused by differences in distinguishing upper-case and lower-case letters in the management client TE, and it is able to execute the management commands of the management server S correctly by distinguishing the nodes according to the case sensitivity information. In addition to the above ADD and GET command examples, the management client TE can take into consideration the case sensitivity information when processing any management command received from the management server S or any command received from somewhere else (e.g. user interface) to refer to, add or modify a node of the management tree. One example is the loading of a new application into the management client TE, in which case the information managed by the application can also be defined in the management tree in accordance with the case sensitivity information. According to one embodiment, the management client TE is also arranged to transmit the case sensitivity information associated with the node to the management server S in response to a fetch request for the node, for instance when the management server fetches a part of the management tree. The adding, deleting and/or modifying of the case sensitivity information can also be arranged in the management client TE.

As described in the OMA DM specification "*SyncML Device Management Tree and Description*", version 1.1.2, 12 Jun. 2003, 44 pages, chapter 9, different equipment manufacturers can by using the DTD (Document Type Description) of the standardized device description framework (DDF) form for the management server S a device description of the device (TE) to be managed, which comprises device-specific property information.

According to one embodiment, device descriptions are documents based on the XML language. For the XML-based documents, a document type definition DTD is made, which in the XML language defines the tags to be used, the structural relations of the elements (!ELEMENT) between the identifiers, and other XML document definitions to be used. As is well known in the XML language, the data element begins with an initial identifier (e.g. <section>) and ends in an end identifier (</section>), and it may contain text or other elements. DTD is in every transmitted document, or they refer to an already known DTD. According to one embodiment, the device description is defined on the basis of the DTD model defined in the OMA device management specification. The DTD model and the device description based thereon define especially elements to identify the equipment manufacturer and the device type and the properties of the nodes definable to the device. Node-specific information defines, among other things, the name of the node, the path to the node, run-time properties of the node and stable node information for the management server. Instead of this type of device description, the invention can also well be applied to other types of device descriptions; for instance, it is possible to use other device description frameworks, such as RDF (Resource Description Framework), CC/PP (Composite Capability/Preference Profiles), CIM (Common Information Model), GUP (Generic User Profile, XML Schema, and UML (Unified Modelling Language).

The DTD model of the device description defines the XML elements to which the equipment manufacturer can define the properties of the device type in question and thus create the device description. On the basis of the device description, the management server S is able to transmit management commands to different devices TE serving as device management clients. In the device description, especially the internal software structure of the management client in the form of the objects to be managed can be defined. The property information can for instance contain, specifically for each node, information on whether the device (more specifically the node to be defined) supports the use of a time stamp (when the node has last been changed), or what MIME types does the node support. The device descriptions are typically specific for each device type and can be defined by the manufacturer already during manufacturing. When the device description is defined, it can be stored into the memory of the management server S, for instance. According to an embodiment, it is also possible to create or modify the device description in the management client TE. For instance, when the software of the management client TE is updated or a new software component is added, it is also possible to define the device description in the management client TE and to store it at least in the memory of TE. With reference to FIG. 3, in step 302, the server S can fetch from its memory at least part of the device description on the basis of the device identifier, such as manufacturing identifier and device type identifier. The device description can alternatively be fetched from another device, even from the management client TE being managed.

According to one embodiment, case sensitivity information is defined in the device description for at least one node. In such a case, DTD of the device description document can already contain one or more elements or fields for the definition of case sensitivity information. The management server S can check the case sensitivity information from the device description in step 303 of FIG. 3.

According to one embodiment, case sensitivity information is defined in the run-time properties of the node, i.e. in the node-specific RTProperties element of the device description of OMA device management, in which case the device description can contain a new element for the definition of case sensitivity information. The case sensitivity information is then a node property to which it is possible to direct at least the fetch command 'GET' and according to one embodiment also the replace command 'REPLACE' for altering the content of the case sensitivity information field. By way of example, a DTD is shown below with respect to the RTProperties element containing the above-mentioned case sensitivity information.

<!ELEMENT RTProperties (ACL, Format, Name, Size?, Title?, TStamp?, Type, VerNo?, CSen)>

The element 'CSen' has been added to DTD to define case sensitivity information. The value of the CSen element can be 'Case Sensitivity' (upper-case and lower-case letters are to be separated) or 'Case Insensitivity' (upper-case and lower-case letter are not to be separated) or an abbreviation or a number, for instance, on the basis of which the server S knows which of the case sensitivity settings applies. The CSen element of a node in a device description document can thus include information on whether to distinguish between upper-case and lower-case letters, and the management server S is arranged to check the content of the CSen element in step 303. The management server S defines in step 304 the node into the device management command according to the value of the CSen element. According to one embodiment, the content of the CSen element can be fetched (in step 302/303) from the management tree in the same manner as other properties associated with the management tree node as described in the OMA DM specification "*SyncML Device Management Tree and Description*", version 1.1.2, chapter 7.3.

According to one embodiment, case sensitivity information is defined in the Type sub-element of the RTProperties element, which defines whether the node in question supports the use of the Type property. Case sensitivity information can then also be defined as the value of the Type element. According to yet another embodiment, case sensitivity information can be defined on a higher level as a new child element of the 'Node' element (which comprises the RTProperties element).

Case sensitivity information can be defined in many different ways, for instance in such a manner that case sensitivity and case insensitivity have their own values. According to another embodiment, only one of these alternatives, for instance case insensitivity, has its own value or flag. In such a case, case insensitivity is arranged only if said value is defined in the properties of the node. According to one embodiment, the case sensitivity information defined in the device description properties of one node or in other information defining the management tree of the management client TE and stored in the management server S affects at least one other node. This way, case sensitivity information need not be defined separately for every node. This embodiment can be implemented in many different ways: according to one embodiment, case sensitivity or insensitivity may be a default for one or more nodes of the entire directory tree, and this default is complied with until otherwise defined in the properties of a node. According to one embodiment, the case sensitivity information defined for a node also applies to the child nodes of the node. For instance, it is possible to define case sensitivity information to the root of the device management tree already in the device description, in which case it can be applied to the entire device management tree. If different case sensitivity information is separately defined in a child node, the defined case sensitivity can be applied at least to the child node in question. Thus, when proceeding along a branch of the management tree, the earlier defined case sensitivity information is valid until new case sensitivity information is defined in a node and can then also be used in the related child nodes. According to one embodiment, the element defining the case sensitivity information is inherited from one node to another in the same manner as the ACL (Access Control List) property, i.e. the server S is arranged to define for a node the case sensitivity information of the parent node, if the node does not have its own case sensitivity information.

According to one embodiment, case sensitivity information is defined as a new element in a standardized DevInfo management object (node) which each OMA DM management client must support and which describes the properties of the management client that are required for a successful device management session. In such a case, the device description (or DTD of the device description document) need not have an element for the definition of case sensitivity, but the case sensitivity information defined in the DevInfo management object applies to all nodes in the management tree of the device. It should be noted that case sensitivity information affecting several nodes could be defined, instead of the DevInfo object, alternatively in another object describing device information or profile.

According to an alternative embodiment, case sensitivity information can also be defined in the framework properties of the device description for one or more nodes as a new element or framework property, for instance. The OMA DM specification "*SynchML Device Management Tree and Description*", version 1.1.2, chapter 9.3.4 describes the current framework properties.

According to yet another embodiment, recursion information is directly or indirectly (e.g. with the node where case sensitivity information is defined) associated with case sensitivity information, in which case the case sensitivity information can be replicated in the management tree when replicating nodes in accordance with the recursion information.

Case sensitivity information can already be defined in the device description made by the equipment manufacturer in such a manner, for instance, that in nodes comprising device-specific settings, upper-case and lower-case letters are always separated, but in other possibly added nodes, such as directory trees added by the management server S, upper-case and lower-case letters are not separated. According to one embodiment, the management server S can change the case sensitivity information or define it for new nodes (e.g. those not described in the device description), such as nodes describing the structure of the file system. This embodiment can be useful if the management server S cannot for instance distinguish the differences between the lower-case and upper-case letters. According to another example, an application developer defines case sensitivity information for the application, i.e. when adding information required for application management to the management tree and/or device description, case sensitivity information is also defined in the information. After this, the information concerning the application can be managed in the manner illustrated above in accordance with the case sensitivity information.

It should be noted that the embodiments described above could also be applied in any combination thereof. Instead of the examples illustrated above, case sensitivity information can also be described as a parameter or sub-element of another node element in the management tree. It is apparent to a person skilled in the art that while the technology advances, the basic idea of the invention can be implemented in many different ways. The invention and its embodiments are thus not restricted to the examples described above, but can vary within the scope of the claims.

The invention claimed is:

1. A method comprising:
checking case sensitivity information associated with at least one node of a device management structure, said case sensitivity information defining whether to distinguish between upper-case letters and lower-case letters in data associated with one or more nodes of the device management structure, and
defining at least one node of the device management structure according to the case sensitivity information,
wherein the device management structure comprises information, associated with a managed device, managed with a device management protocol between a device management client and a device management server.

2. A method as claimed in claim 1, wherein said checking comprises checking the case sensitivity information from a device description of the managed device, said device description comprises the properties of at least one node in the device.

3. A method as claimed in claim 1, wherein said checking comprises checking the case sensitivity information from the device management structure, the case sensitivity information being defined in the device management structure.

4. A method as claimed in claim 1, further comprising:
generating a management command in the device management server, with node information defined according to the case sensitivity information, and
transmitting the management command to the device management client.

5. A method as claimed in claim 4, wherein the at least one node is defined according to OMA device management standard.

6. A method as claimed in claim 1, wherein the checking of the case sensitivity information is performed in response to a need to create a new node or to refer to a node already in the device management structure, the name of the node is defined in accordance with the case sensitivity information by either distinguishing between the upper-case and lower-case letters, or not distinguishing between them.

7. A method as claimed in claim 1, wherein said checking comprises:
checking the case sensitivity information of a first node in response to a need to check the case sensitivity information of a second node
being defined according to the case sensitivity information associated with the first node.

8. A method as claimed in claim 1, further comprising:
referring to an already stored node or adding a new node to the device management structure according to the case sensitivity information.

9. A method as claimed in claim 8 wherein the node is defined in the device management structure according to a management command received from the device management server.

10. A method as claimed in claim 8, wherein the at least one node is defined according to OMA device management standard.

11. A device management system comprising:
at least a device management server, including a memory; and
at least one device management client, including a memory storing a management structure, to be managed, the device management server being configured to manage via a device management protocol the at least one device management client by checking the management structure which comprises information associated with the device management client and at least one node, wherein at least one node is associated in the device management system with case sensitivity information defining whether to distinguish between upper-case and lower-case letters, and
the device management system is configured to define at least one node of the management structure according to the case sensitivity information.

12. A data processing device comprising:
a memory storing information associated with a device management structure; and
a processor configured to:
check the case sensitivity information associated with at least one node of the device management structure, said case sensitivity information defines whether to distinguish between upper-case and lower-case letters in data associated with one or more nodes of the device management structure, and
define at least one node of the device management structure according to the case sensitivity information,
wherein the device management structure comprises information, associated with a managed device, managed with a device management protocol between a device management client and a device management server.

13. A data processing device as claimed in claim 12, wherein the processor is configured to check the case sensitivity information from a device description of the managed device, said device description comprises properties of at least one node in the device management structure.

14. A data processing device as claimed in claim 12, wherein the processor is configured to check the case sensitivity information from the device management structure, the case sensitivity information being defined in the device management structure.

15. A data processing device as claimed in claim 12, wherein the processor is configured to check the case sensitivity information in response to a need to create a new node or refer to a node already in the device management structure, the name of the node being defined in accordance with the case sensitivity information by either distinguishing between the upper-case and lower-case letters, or not distinguishing between them.

16. A data processing device as claimed in claim 12, wherein the processor is configured to check the case sensitivity information of a first node in response to a need to check the case sensitivity information of a second node, said second node being defined according to the case sensitivity information associated with the first node.

17. A data processing device as claimed in claim 12, wherein the data processing device is configured to serve as the device management client, and
the processor is configured to refer to an already stored node or to add a new node to the device management structure according to the case sensitivity information.

18. A data processing device as claimed in claim 17, wherein the processor is configured to define the node in the device management structure according to a management command received from the device management server.

19. A data processing device as claimed in claim 17, wherein the data processing device is a device management client according to the OMA device management standard.

20. A data processing device as claimed in claim 17, wherein the data processing device is a mobile station.

21. A data processing device as claimed in claim 12, wherein the data processing device is configured to serve as the device management server and the processor is further configured to:
generate a management command with node information defined according to the case sensitivity information, and
transmit the management command to the device management client.

22. A data processing device as claimed in claim 21, wherein the data processing device is a device management server according to the OMA device management standard.

23. A data processing device as claimed in claim 12, wherein the data processing device is configured to serve as the device management client, and
the processor is configured to refer to an already stored node and to add a new node to the device management structure according to the case sensitivity information.

24. A non-transitory computer readable medium encoded with a computer program that is downloadable into the memory of a data processing device, wherein the computer program comprises a computer program code which, when executed in the processor of the data processing device, causes the data processing device to:

check the case sensitivity information of at least one node of a device management structure, said case sensitivity information defining whether to distinguish between upper-case and lower-case letters in data associated with one or more nodes of the device management structure, and define at least one node of the device management structure according to the case sensitivity information wherein the device management structure comprises information, associated with a managed device, managed with a device management protocol between a device management client and a device management server.

\* \* \* \* \*